United States Patent
Schoorens et al.

(10) Patent No.: US 10,915,119 B2
(45) Date of Patent: Feb. 9, 2021

(54) METHOD, COMPUTER-PROGRAM PRODUCT AND SYSTEM FOR DYNAMICALLY CONTROLLING A FLUIDIC NETWORK

(71) Applicant: SUEZ GROUPE, Paris la Defense (FR)

(72) Inventors: Jérôme Schoorens, Carignan de Bordeaux (FR); Jean-Jacques Perarnaud, Villenave d'Ornon (FR)

(73) Assignee: SUEZ GROUPE, Paris la Défense (FR)

( * ) Notice: Subject to any disclaimer, the term of this patent is extended or adjusted under 35 U.S.C. 154(b) by 98 days.

(21) Appl. No.: 16/309,584

(22) PCT Filed: Jun. 12, 2017

(86) PCT No.: PCT/EP2017/064215
§ 371 (c)(1),
(2) Date: Dec. 13, 2018

(87) PCT Pub. No.: WO2017/216080
PCT Pub. Date: Dec. 21, 2017

(65) Prior Publication Data
US 2019/0310662 A1    Oct. 10, 2019

(30) Foreign Application Priority Data

Jun. 14, 2016 (FR) ...................................... 16 55502

(51) Int. Cl.
*G05D 7/06* (2006.01)
*G01W 1/10* (2006.01)
(Continued)

(52) U.S. Cl.
CPC ............ *G05D 7/0617* (2013.01); *G01W 1/10* (2013.01); *G05B 13/04* (2013.01); *G05B 17/02* (2013.01)

(58) Field of Classification Search
CPC ....... G05D 7/0617; G05B 13/04; G05B 17/02; G01W 1/10
See application file for complete search history.

(56) References Cited

U.S. PATENT DOCUMENTS

2011/0307106 A1\* 12/2011 Dutt .......................... E03F 7/00
                                                            700/282
2015/0025868 A1\* 1/2015 Nesbitt ..................... E03F 3/02
                                                            703/9
(Continued)

OTHER PUBLICATIONS

Cembrano et al., "Optimal control of urban drainage systems. A case study", Control Engineering Practice, 2004, pp. 1-9, vol. 12, No. 1, DOI: 10.1016/S0967-0661(02)00280-0.
(Continued)

*Primary Examiner* — Vincent H Tran
(74) *Attorney, Agent, or Firm* — Nixon & Vanderhye

(57) ABSTRACT

Disclosed is a method for dynamically controlling a fluidic network with a supervising module, the method including: an operation-forecasting step that generates a forecast datum relating to operation of the fluidic network; a step of selecting a control strategy for the fluidic network on the basis of a metrological datum and/or a meteorological datum and/or the forecast datum; a step of generating setpoints intended for an actuator of a unit for regulating the fluidic network, on the basis of the selected control strategy, the metrological datum or the meteorological datum or the forecast datum; and transmitting the regulation setpoint to the actuator.

20 Claims, 1 Drawing Sheet

(51) Int. Cl.
G05B 13/04 (2006.01)
G05B 17/02 (2006.01)

(56) References Cited

U.S. PATENT DOCUMENTS

| | | | | |
|---|---|---|---|---|
| 2016/0053990 A1* | 2/2016 | Chattopadhyay | ....... | F22B 1/284 |
| | | | | 702/130 |
| 2016/0115675 A1* | 4/2016 | Quigley | ................ | E03B 1/042 |
| | | | | 700/282 |
| 2016/0380856 A1* | 12/2016 | Ben Hamida | ........... | H04L 43/10 |
| | | | | 709/224 |
| 2019/0004484 A1* | 1/2019 | Cussonneau | ....... | G05B 13/0265 |

OTHER PUBLICATIONS

International Search Report, dated Sep. 6, 2017, from corresponding PCT application No. PCT/EP2017/064215.

* cited by examiner

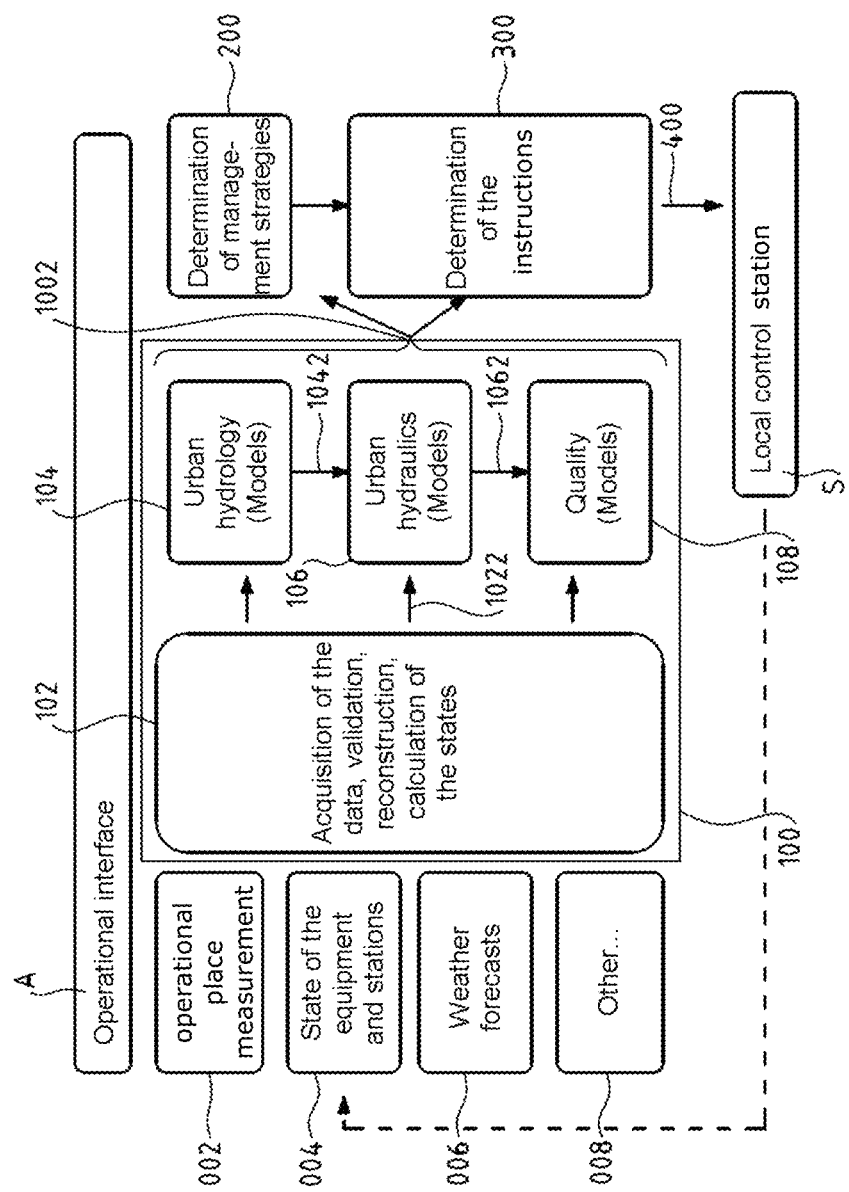

METHOD, COMPUTER-PROGRAM PRODUCT AND SYSTEM FOR DYNAMICALLY CONTROLLING A FLUIDIC NETWORK

The present invention belongs to the field of the pilotage of a fluidic network.

The present invention also relates to a computer program product for implementing the method according to the invention and also to a dynamic control system.

PRIOR ART

At the present time, fluidic networks, notably those of the sewerage network type, present risks with regard to the spillage and to the overflow of the fluid transported by the network into the natural environment. There accordingly exists a need, for a fluidic network, to control equipment of said network in an optimal manner by determining an operational configuration of said fluidic network.

One aim of the invention is to provide a method for controlling the fluidic network taking advantage of the existing heritage within said fluidic network, in other words its equipment, with the aim of limiting the investments while at the same time enhancing the performance of the fluidic network.

DESCRIPTION OF THE INVENTION

According to a first aspect of the invention, such an objective is achieved with a method for dynamic control of a fluidic network by a supervision module, said method comprising:
- a step, referred to as operational forecast step, comprising the generation of a forecast data, relating to an operation of said fluidic network over a period, referred to as operational forecast period, the operational forecast period preferably being greater than an operational forecast period threshold, said operational forecast step implementing a hydraulic model, of the parametric type, the hydraulic model receiving data, referred to as data of the model, said data of the model comprising at least:
  - a metrological data relating to a state of a piece of metrology equipment of said fluidic network, said metrological data being generated during a step, referred to as metrological data generation step,
  - a meteorological data relating to a weather forecast affecting said fluidic network, said meteorological data being generated during a step, referred to as weather forecast generation step, said meteorological data describing a weather forecast over a period, referred to as weather forecast period,
  said operational forecast step furthermore comprising a step of online calibration of said hydraulic model using said metrological data,
- a step, referred to as control strategy selection step, comprising a selection of a strategy for controlling said fluidic network based on said metrological data and/or on said meteorological data and/or on said forecast data,
- a step, referred to as instruction generation step, comprising the generation of a regulation instruction intended for an actuator of a regulation mechanism of said fluidic network, using said selected control strategy, said metrological data and/or said meteorological data and/or said forecast data, transmission of the regulation instruction to said actuator.

Preferably, the method according to the invention is implemented in real time.

The fluidic network may be a water treatment or sewerage network.

The operational forecast period threshold is preferably greater than two hours.

A model of the parametric type is a model comprising parameters, where said parameters may be adjusted such that the calculated values of a variable or of a quantity by said model are as close as possible to the observed values of this variable or of this quantity.

When the fluidic network is of the hydraulic type, permanently infiltrating clear water, or PICW, may affect said network. Said permanently infiltrating clear water is taken into account by the model by means of feedback of informational metrological data, by metrology equipment of said fluidic network, relating to the presence of this permanent infiltration clear water within said metrology equipment.

'Online calibration step' in the present application denotes a dynamic calibration of the model carried out in such a manner that the calculated values of a variable or of a quantity by said model are as close as possible to the observed values of this variable or of this quantity.

'Control strategy' in the present application denotes a strategy for management of the fluidic network.

At least one objective of the present invention is met by the coupling of the operational forecast step and control strategy selection steps.

The control method according to the invention may comprise the receipt of the regulation instruction, by the actuator, and the application of said regulation instruction.

The application of the regulation instruction may for example be carried out automatically by an electronic actuator after receiving the regulation instruction, for example via a telephone network or a data network.

Alternatively, or in combination with the above, the application of the regulation instruction may for example be carried out by an operator, after receiving said regulation instruction, for example via a telephone network.

Metrology equipment may refer, for example, to a hydraulic sensor or a rain gauge. More generally, a metrological data relating to a metrology equipment may be any data relating to data supplied by a supervision system, for example a SCADA system, of the fluidic network.

A regulation mechanism may, for example, be a sectioning or zoning valve, a regulated threshold, a pumping station, a retention basin or a pump.

Numerous means may be implemented, according to the invention, in order for the duration of all of the steps of the method to take less than a threshold time, referred to as the cycle period, said cycle period preferably being less than 5 minutes.

For this purpose, it is for example possible, according to a first embodiment, to implement an optimized step of acquisition of the metrological data, for example by only sampling the latest data generated by the metrology equipment.

It is also possible, as a combination or alternately with the first possibility, to implement a method comprising a step of associating a qualification with each metrological data relating to conditions of its acquisition and/or of its archiving. It is then possible to optimize the interrogation of databases comprising said model data by generating requests for interrogation of said databases comprising a restriction of the search field to a particular acquisition condition and/or to a particular archiving.

It is also possible, as a combination or alternately with one or more of the preceding possibilities, to implement parallelization algorithms. It is for example possible to perform calculations specific to the qualification in parallel.

It is also possible, as a combination or alternately with one or more of the preceding possibilities, to implement configurations of the hydrological and hydraulic models. It is for example possible, rather than implementing a calculation algorithm on a very detailed model of the network, to determine, by aggregation, one or more aggregates of one or more nodes of the network and to implement said calculation algorithm using said one or more determined aggregates. This feature offers the advantage of stabilizing the calculations and thus limiting the processing time.

It is also possible, as a combination or alternately with one or more of the preceding possibilities, to implement methods referred to as 'hot start processes'.

It is also possible, as a combination or alternately with one or more of the preceding possibilities, to store calculations, that are non-cyclical but used in each calculation cycle, in a buffer memory. For example, it is possible to store in a buffer memory a spatial allocation of the rain gauges with the watershed when precipitation of water billow are calculated.

Advantageously, one data from the data of the model of the method is associated with a state, referred to as validation state, said method furthermore comprising a step of filtering said data based on said validation state. The validation state may, for example, be chosen from between two states: 'valid state' and 'invalid state'. It is thus possible to take into account, or not to take into account, any piece of data from the model, for example a metrological data or a meteorological data.

When a data is invalid, it is possible not to take this data into account in calculation and decision-making processes implemented in the operational forecast step and/or in the step for selection of a control strategy. This invalidation may be carried out on values already acquired or on a series of future data when an operator is, for example, in possession of information allowing a possible malfunction to be anticipated, which may for example be due to a maintenance intervention, a rainfall or equipment test.

According to one possibility of the method according to the invention, the validation state is determined based on a validation method of the automatic type. Expert algorithms may be implemented in order to carry out such determinations of the validation state for a data.

According to another possibility of the method according to the invention, potentially in combination with, prior to or after the automatic step of determining the validation state, the validation state is determined using a validation method of the manual type. It is thus possible to let experts determine the validation state of said data manually.

Advantageously, one data from said data of the model is associated with a state, referred to as priority state, the method furthermore comprising a step of sorting said data based on said priority state. The priority state may, for example, be chosen from amongst the natural integers. It is thus possible to take into account, with a higher priority or otherwise with respect to another data, any data of the model, for example a metrological data or a meteorological data.

According to one possibility of the method according to the invention, the priority state is determined using a sorting method of the automatic type. Expert algorithms may be implemented in order to carry out such determinations of the priority state of a data.

According to another possibility of the method according to the invention, potentially in combination with, prior to or after the automatic step of determining the priority state, the priority state is determined using a sorting method of the manual type. It is thus possible to let experts determine the priority state of said data manually.

Advantageously, a piece of equipment for determining the state of a metrology equipment can determine the state of the metrology equipment and generate a state data for the metrology equipment, the metrological data being generated based on said state data. The step of determining the state of the metrology equipment may be implemented prior to the other steps of the method.

For example, the step of determining the state of the metrology equipment may be implemented in order to invalidate, for a predetermined period in the future, and to generate metrological data not taken into account by the model during said predetermined period. Several technical solutions are possible, for example that of eliminating said metrological data or, alternatively, assigning it an invalid status or else a zero priority.

According to one particular feature, the step of generating a weather forecast may comprise a step of receiving and a step of processing external data coming from a rain gauge and/or from a rainfall radar, the meteorological data being generated from the processing of said external data. It is thus possible to acquire external raw data, and to process it in order to determine a weather forecast. The raw external data may come from a metrology equipment, such as a rain gauge, or else from water billow radar, for example, from a communications network connected to a rainfall radar.

According to one possibility, the control strategy is selected manually. This possibility allows decisions on the control of the fluidic network to be taken by experts.

According to another possibility, the control strategy is selected automatically. This strategy may be selected by decision algorithms, for example according to decision trees. This feature offers the advantage of allowing a decision to be taken by control models.

Preferably, the step of generating metrological data and/or the step of generating weather forecasts is implemented at a predetermined frequency, preferably according to a time period of less than 5 minutes. This feature offers the advantage of allowing the acquired data to be refreshed virtually in real-time, which allows a better calibration of the model.

Preferably, the weather forecast period is greater than a meteorological period threshold, said meteorological period threshold preferably being greater than 1 hour. This feature offers the advantage of allowing a medium-term weather forecast to be provided.

According to a second aspect of the invention, a computer program product is provided that is downloadable from a communications network and/or stored on a medium readable by computer and/or executable by a microprocessor, characterized in that it comprises program code instructions for the implementation of a method for dynamic control in real time of a fluidic network according to the first aspect of the invention.

According to yet another aspect of the invention, a system for dynamic control of a fluidic network is provided comprising:

a module, referred to as operational forecast module, configured for generating a forecast data, relating to an operation of the fluidic network over a period, referred to as operational forecast period, the operational forecast period preferably being greater than an operational forecast period threshold, said operational forecast module comprising a hydraulic model, of the parametric type, the hydraulic model being configured for receiving data, referred to as data of the model, said data of the model comprising at least:
- a metrological data relating to a state of a metrology equipment of said fluidic network, said metrological data being generated by a module, referred to as metrological data generation module,
- a meteorological data relating to a weather forecast affecting said fluidic network, said meteorological data being generated by a module, referred to as weather forecast generation module, said meteorological data describing a weather forecast over a period, referred to as weather forecast period, said operational forecast module furthermore comprising means of calibration of said hydraulic model using said metrological data, a module, referred to as control strategy selection module, configured for selecting a control strategy of said fluidic network based on said metrological data and/or on said meteorological data and/or on said forecast data, a module, referred to as instruction generation module, configured for generating a regulation instruction intended for an actuator of a regulation mechanism of said fluidic network, based on said control strategy, and/or on said metrological data, and/or on said meteorological data, and on said forecast data, a transmission module configured for transmitting said regulation instruction to said actuator.

Advantageously, the fluidic network may be a sewerage network comprising a discharge system, preferably a purification station when the fluidic network is a water sewerage network, the step of generating a metrological data comprising the acquisition of a metrological data relating to this discharge system.

A metrological data relating to this discharge system may, for example, be a data relating to the capacity of the purification station. This capacity may be determined, preferably directly, from the pumping capacity and/or from the transfer capacity available at the inlet of the purification station. It is notably possible to reduce the flow at the inlet of the purification station if the latter has a limited processing capacity.

A metrological data relating to this discharge system may, alternately or in combination with the above, for example, be a data relating to a treatment process functionally integrated into said purification station.

A metrological data relating to this discharge system may, alternately or in combination with the above, for example, relate to a performance, and/or a state of operation of a process of the purification station. A process may be a pre-treatment process, a primary settling tank, a biofilter.

DESCRIPTION OF THE FIGURES

Other features and advantages of the invention will become apparent upon reading the detailed description of embodiments and of their implementations which are in no way limiting, with regard to the appended FIGURES in which:

FIG. 1 is a schematic view of one embodiment of a method according to the invention.

DESCRIPTION OF THE INVENTION

Since this embodiment is to be taken as non-limiting, variants of the invention could notably be implemented only comprising a selection of features described in the following, such as described or generalized, isolated from the other features described, if this selection of features is sufficient to endow the invention with a technical advantage or to differentiate it with respect to the prior art.

FIG. 1 illustrates one embodiment of a method 1 for dynamic control of a fluidic network by a supervision module, said method comprising:
- a step 100, referred to as operational forecast step,
- a step 200, referred to as control strategy selection step,
- a step 300, referred to as instruction generation step,
- a transmission 400 of the regulation instruction to an actuator of the fluidic network.

The operational forecast step 100 comprises:
- a step 102 for data acquisition, for validation, for reconstruction and for calculation of the states,
- a step 104 comprising an implementation of urban hydrology models,
- a step 106 comprising an implementation of urban hydraulic models,
- a step 108 comprising an implementation of quality models.

The step 102 receives input data, which may originate:
- from a step 002 for determining operational place metrological data, which comprises measurements, for example of the level, over a operational place able to affect, or be affected by, the fluidic network,
- from a step 004 for determining data relating to states of equipment and of stations, which comprise descriptions of equipment and of stations of the fluidic network,
- from a step 006 for determining weather forecast data, which comprise weather forecasts likely to affect the fluidic network,
- from a step 008 for determining other data able to affect the fluidic network, such as data relating to a scheduled maintenance of an equipment of the fluidic network, or data relating to the air or wind characteristics, or else to sea or ocean conditions, for example the level of the sea and/or swell and/or evaporation conditions, or data relating to ground bacteriological flows coming, for example, from the fluidic network or from (a) river(s).

The step 102 generates data 1022 which may be used by the step 104, and/or the step 106, and/or the step 108.

The urban hydrology models implemented during the step 104 comprise at least one hydraulic model. The hydraulic model may, for example, be pre-existing when a method or a system according to the invention is implemented.

The step 104 generates data 1042 which may be used by the step 106.

The urban hydraulic models implemented during the step 106 comprise at least one hydraulic model of the parametric type.

The hydraulic model receives data, referred to as data of the model. The data of the model comprise at least:
- one metrological data 1042 relating to a state of a metrology equipment of the fluidic network. The metrological data is generated during a step, referred to as metrological data generation, implemented during the step 104, and
- one meteorological data, included within the data 1022, generated during the step 102. The meteorological data relates to a weather forecast affecting said fluidic network. The meteorological data describes a weather forecast over a period, referred to as weather forecast period.

The data of the hydraulic model may comprise another data, included in the data 1022, generated during the step 102. The other data may for example be a data coming from measurements of level over an operational place.

The operational forecast step 100 furthermore comprises an online calibration step, not shown, for the hydraulic model using the metrological data 1042. The online calibration step is implemented during the step 106.

The step 106 generates data 1062 which may be used by the step 108.

The quality models implemented during the step 108 comprise at least one bacteriological quality model of the natural environment. A bacteriological quality model of the natural environment implements, for example, data coming from the step 008, for example data relating to the air properties, or else ocean or sea conditions, for example the level of the sea and/or swell and/or evaporation conditions, or data relating to terrestrial bacteriological flows originating, for example, from the fluidic network or from (a) river(s).

The step 108 generates an output data, which is also an output data of the step 100, referenced 1002, which may be used by one and/or the other of the steps 200 and 300.

The output data 1002 is a forecast data, relating to an operation of the fluidic network, over a period, referred to as operational forecast period.

The operational forecast period may be greater than an operational forecast period threshold. The operational forecast period threshold may be greater than two hours.

The step 200 comprises a selection of a strategy for controlling the fluidic network based on the metrological data and/or on the meteorological data 1042 and/or on the forecast data 1002.

The selection of the control strategy may comprise the implementation of decision trees, implementing metrological data, and/or meteorological data, and/or forecast data.

The selection of a control strategy may comprise a selection method with a hysteresis, thus tending to conserve a control strategy, after selection of said control strategy, when the external cause having led to said selection has ceased.

The control strategy may be updated every 5 minutes.

The control strategy may be chosen from amongst the following strategies:
  management in dry weather,
  management of pollution abatement, and
  management in the case of flooding.

The dry weather control strategy aims to manage the supply in dry weather. In dry weather, the effluents are treated in the purification station. The storage by the storage capacities is then prohibited. The discharge into the natural environment, in other words, for example into the sea, an estuary or else a river is also prohibited. It goes without saying that the control configuration is determined in such a manner as to avoid any overflow.

The strategy for managing pollution abatement promotes the use of storage and of transport capacities of the fluidic network furthermore limiting the spillages into the natural environment.

The management strategy in the case of flooding is used when the nature of a rain event presents risks of flooding and when the storage capacities of the fluidic network have all been exploited to their maximum. The use of storage capacities and of transport of the fluidic network are promoted by authorizing overflows into the natural environment, for example a river or the sea.

The step 300 comprises the generation of a regulation instruction intended for the actuator of a regulation mechanism of the fluidic network, based on the control strategy selected during the step 200, on the metrological data and/or on said meteorological data 1042 and/or on said forecast data 1002.

Once the transmission 400 of the regulation instruction to said actuator has been carried out, one or more local control stations S can receive said instruction, for example via a communications network, potentially comprising means of wireless transmission.

The local control station comprising said actuator may then apply said actuator instruction, preferably automatically, which then modifies the state of an equipment comprising said actuator. This modification is illustrated, in FIG. 1, by the dashed line connecting the local control stations S and the step 004.

The various steps may be supervised by means of an operational interface A, for example implementing on the form of a computer program product.

It goes without saying that the invention is not limited to the examples described hereinabove and numerous modifications may be applied to these examples without straying from the framework of the invention.

In addition, the various features, forms, variants and embodiments of the invention may be associated with one another according to various different combinations as long as they are not incompatible or mutually exclusive.

The invention claimed is:

1. A method for dynamic control of a fluidic network by a supervision module, said method comprising:
  an operational forecast step, comprising generation of a forecast data relating to an operation of said fluidic network over an operational forecast period, said operational forecast step implementing a hydraulic model of parametric type, the hydraulic model receiving data of the model that comprises at least:
    one metrological data relating to a state of a metrology equipment of said fluidic network, said metrological data being generated during a metrological data generation step,
    one meteorological data relating to a weather forecast affecting said fluidic network, said meteorological data being generated during a weather forecast generation step, said meteorological data describing a weather forecast over a weather forecast period,
  said operational forecast step furthermore comprising an online calibration step of said hydraulic model using said metrological data;
  a control strategy selection step, comprising a selection of a control strategy of said fluidic network based on said metrological data and/or on said meteorological data and/or on said forecast data;
  an instruction generation step, comprising generation of a regulation instruction for an actuator of a regulation mechanism of said fluidic network, based on said selected control strategy, on said metrological data and/or on said meteorological data and/or on said forecast data; and
  transmission of the regulation instruction to said actuator.

2. The method as claimed in claim 1, wherein a duration of all of the steps of the method is less than a threshold cycle period, said threshold cycle period being less than 5 minutes.

3. The method as claimed in claim 2, wherein a data of said data of the model is associated with a validation state, the method furthermore comprising a step of filtering said data based on said validation state.

4. The method as claimed in claim 2, wherein an equipment for determining the state of the metrology equipment determines the state of the metrology equipment and generates a state data for the metrology equipment, the metrological data being generated from said state data.

5. The method as claimed in claim 1, wherein a data of said data of the model is associated with a validation state, the method furthermore comprising a step of filtering said data based on said validation state.

6. The method as claimed in claim 5, wherein the validation state is determined using a validation method of the automatic type.

7. The method as claimed in claim 6, wherein an equipment for determining the state of the metrology equipment determines the state of the metrology equipment and generates a state data for the metrology equipment, the metrological data being generated from said state data.

8. The method as claimed in claim 5, wherein an equipment for determining the state of the metrology equipment determines the state of the metrology equipment and generates a state data for the metrology equipment, the metrological data being generated from said state data.

9. The method as claimed in claim 1, wherein an equipment for determining the state of the metrology equipment determines the state of the metrology equipment and generates a state data for the metrology equipment, the metrological data being generated from said state data.

10. The method as claimed in claim 1, wherein the step of generating weather forecasts comprises a step of receiving and processing external data coming from a rainfall gauge and/or from a rainfall radar, the meteorological data being generated from the processing of said external data.

11. The method as claimed in claim 1, wherein the control strategy is selected manually.

12. The method as claimed in claim 1, wherein the control strategy is selected automatically.

13. The method as claimed in claim 1, wherein the step of generating metrological data and/or the step of generating weather forecasts is implemented at a predetermined frequency.

14. The method as claimed in claim 13, wherein the predetermined frequency is a time period of less than 5 minutes.

15. The method of claim 1, wherein the operational forecast period is greater than an operational forecast period threshold.

16. A non-transitory computer-readable medium on which is stored program code instructions that, upon execution by a microprocessor of a supervision module, causes the supervision module to perform the following steps:
an operational forecast step, comprising generation of a forecast data relating to an operation of said fluidic network over an operational forecast period, said operational forecast step implementing a hydraulic model of parametric type, the hydraulic model receiving data of the model that comprises at least:
one metrological data relating to a state of a metrology equipment of said fluidic network, said metrological data being generated during a metrological data generation step,
one meteorological data relating to a weather forecast affecting said fluidic network, said meteorological data being generated during a weather forecast generation step, said meteorological data describing a weather forecast over a weather forecast period,
said operational forecast step furthermore comprising an online calibration step of said hydraulic model using said metrological data;
a control strategy selection step, comprising a selection of a control strategy of said fluidic network based on said metrological data and/or on said meteorological data and/or on said forecast data;
an instruction generation step, comprising generation of a regulation instruction for an actuator of a regulation mechanism of said fluidic network, based on said selected control strategy, on said metrological data and/or on said meteorological data and/or on said forecast data; and
transmission of the regulation instruction to said actuator.

17. A system for real-time dynamic control of a fluidic network, comprising:
an operational forecast module, configured for generating a forecast data relating to an operation of the fluidic network over an operational forecast period, the operational forecast period being greater than an operational forecast period threshold, said operational forecast module comprising a hydraulic model of parametric type, the hydraulic model being configured for receiving data of the model, said data of the model comprising at least:
one metrological data relating to a state of a metrology equipment of said fluidic network, said metrological data being generated by a metrological data generation module,
meteorological data relating to a weather forecast affecting said fluidic network, said meteorological data being generated by a weather forecast generation module, said meteorological data describing a weather forecast over a weather forecast period;
means for calibrating said hydraulic model using said metrological data;
a control strategy selection module, configured for selecting a control strategy of said fluidic network based on said metrological data and/or on said meteorological data and/or on said forecast data;
an instruction generation module, configured for generating a regulation instruction for an actuator of a regulation mechanism of said fluidic network, based on said control strategy, and/or on said metrological data, and/or on said meteorological data, and on said forecast data; and
a transmission module configured for transmitting said regulation instruction to said actuator.

18. The system as claimed in claim 17, wherein the fluidic network is a sewerage network comprising a discharge system, and the metrological data comprises data relating to the discharge system.

19. The system of claim 18, wherein the sewerage network is a water sewerage network comprising a purification station.

20. The system of claim 17, wherein the operational forecast period threshold is 2 hours.

* * * * *